United States Patent
Srinivasan et al.

(10) Patent No.: US 7,941,558 B2
(45) Date of Patent: May 10, 2011

(54) LOOP ELIMINATION IN A COMMUNICATIONS NETWORK

(75) Inventors: Shriram Srinivasan, Santa Clara, CA (US); Shantanu R. Kothavale, Santa Clara, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 2159 days.

(21) Appl. No.: 10/314,680

(22) Filed: Dec. 9, 2002

(65) Prior Publication Data

US 2003/0225908 A1    Dec. 4, 2003

Related U.S. Application Data

(60) Provisional application No. 60/385,861, filed on Jun. 4, 2002.

(51) Int. Cl.
*G06F 15/173*    (2006.01)
(52) U.S. Cl. ....................................................... 709/243
(58) Field of Classification Search .................. None
See application file for complete search history.

(56) References Cited

U.S. PATENT DOCUMENTS

| | | | |
|---|---|---|---|
| 6,188,694 B1 * | 2/2001 | Fine et al. | 370/402 |
| 6,298,061 B1 * | 10/2001 | Chin et al. | 370/400 |
| 6,765,881 B1 * | 7/2004 | Rajakarunanayake | 370/256 |
| 6,804,712 B1 * | 10/2004 | Kracht | 709/223 |
| 6,937,576 B1 * | 8/2005 | Di Benedetto et al. | 370/256 |
| 6,985,449 B2 * | 1/2006 | Higashiyama | 370/256 |
| 6,987,740 B1 * | 1/2006 | Di Benedetto et al. | 370/256 |
| 2001/0025318 A1 | 9/2001 | Higashiyama | |
| 2002/0009092 A1 | 1/2002 | Seaman et al. | |

* cited by examiner

*Primary Examiner* — John Follansbee
*Assistant Examiner* — Alan S Chou
(74) *Attorney, Agent, or Firm* — Wilson + Ham + Holman

(57) ABSTRACT

Loop-elimination in a network is provided by establishing a physical topology based domain within the network and restricting protocol data units that are received within the physical topology based domain from being consumed at a network node outside of the physical topology based domain, wherein the protocol data units include loop-elimination information. The loop-elimination technique may also include identifying a logical based domain that exists within the network and then restricting protocol data units that are received within the physical topology based domain and the logical based domain from being consumed outside of the physical topology based domain and the logical based domain.

29 Claims, 11 Drawing Sheets

STP

Physical Topology Based BPDU Restrictions

| Domain 10 | Domain 20 | Domain 30 |
|-----------|-----------|-----------|
| A, E      | B, C, D   | A, C, D, E |

FIG. 10A

Physical Topology and Logical Domain Based BPDU Restrictions

| Domain 10 | Domain 20 | Domain 30 | Domain 40 | Domain 50 | Domain 60 |
|-----------|-----------|-----------|-----------|-----------|-----------|
| A         | B, D      | A, D      | E         | C         | C, E      |

FIG. 10B

LOOP ELIMINATION IN A COMMUNICATIONS NETWORK

CROSS REFERENCE TO RELATED APPLICATION

This application is entitled to the benefit of provisional Patent Application Serial No. 60/385,861, filed Jun. 4, 2002.

FIELD OF THE INVENTION

The invention relates to communications network protocols, and more particularly to protocols for eliminating loops in a communications network.

BACKGROUND OF THE INVENTION

Loops in the active topology of bridged networks can lead to severe problems including unicast frame duplication, multicast frame duplication, and address table nonconvergence. The inability to tolerate active loops is a fundamental limitation to the topology of bridged networks. Such loops must be eliminated to ensure proper network operation. Generically speaking, two approaches have been taken in the past to eliminate loops: manual and automatic configuration.

Manual configuration simply means to configure the passive topology of the network so as to avoid loops. However, it is not always possible or even desirable to manually configure a loop-free topology. Manual configuration of a loop-free topology is generally only acceptable for small networks. Additionally, even in small networks link redundancy may be necessary and therefore small networks may have loops.

Automatic configuration eliminates loops in the active topology of the network by means of a special computer protocol. An example of a protocol used for eliminating loops in a network is Spanning Tree Protocol (STP). STP was developed as a vendor-independent protocol to solve the problem of network loops and a formal specification of the protocol is contained in the Institute of Electrical and Electronics Engineers (IEEE) 802.01D standard. As defined in the 802.01D standard, the elements of a network that are affected by STP are referred to as the root bridge, designated bridges, root ports, and designated ports. The network elements existing in an STP setting are all part of a "tree" that spans (encompasses) all of the parts of the network without creating any active loops. STP assigns a single path with the lowest path cost between any two endpoints. STP prevents loops from forming by deactivating ports that have a higher path cost than other ports capable of carrying traffic to the same destination.

One disadvantage to applying STP in a geographically large network is that STP tries to calculate a spanning tree (i.e., compute port states) that covers the entire network. Because the entire network is covered by one spanning tree, network resources may be overburdened with carrying STP configuration messages throughout the network STP configuration messages are commonly referred to as Bridge Protocol Data Units (BPDUs). Additionally, typically, network providers and network customers do not desire to share the same spanning tree instance, so having only one spanning tree that covers the entire network, as in the case of STP, is a problem. Furthermore, in a geographically large network, a limitation on the number of hops that a BPDU can take may cause BPDUs to expire before they reach the most distant nodes in the network. Thus, using STP in a large network can tie up valuable resources and result in needless congestion.

FIG. 1 depicts a bridged network 100 that is connected by network nodes 110, 112, 114, 116, 118, and 120, and composed of three ring structures. Applying the known STP protocol, the network would be configured into a single loop-free spanning tree. As depicted in the embodiment of FIG. 1, there are no boundaries within the network 100 to restrict circulation of BPDUs 111, as the BPDUs 111 travel freely throughout the entire network 100. Since the BPDUs 111 travel freely throughout the entire network, there is a delay in communicating traffic through the network while the spanning tree is established. Additionally, since the BPDUs 111 typically have an age (i.e. a maximum number of hops) beyond which they expire, the BPDUs 111 may expire before traveling from the root bridge to the other end of the network. Furthermore, although STP provides a loop-free path, it does not necessarily provide the best or most direct path since STP considers only physical topology and not logical topology (i.e., VLAN)

In an attempt to address the problems associated with STP, per-Virtual Local Area Network Spanning Tree Protocol (PVST) was created. PVST operates in a similar fashion to STP, however, it limits circulation of BPDUs and related spanning tree calculations to within a particular Virtual Local Area Network (VLAN). Although PVST eliminates some of the problems associated with STP, if a VLAN spreads over a large geographical area, then PVST can incur the same types of congestion and BPDU expiration problems as STP. Additionally, since network providers and network customers can share the same VLAN, like STP, PVST does not eliminate the problem of the provider and customer sharing the same spanning tree instance. FIG. 2 depicts a bridged network 200 connected by network nodes 210, 212, 214, 216, 218, and 220, composed of three ring structures and supporting two VLANs, VLAN A, and VLAN B. In the embodiment of FIG. 2, VLAN A is physically separated into two portions that exist on either side of VLAN B. In order to prevent loops within VLAN A, the BPDUs 211 originating in either portion of VLAN A travel throughout all of VLAN A. As depicted in FIG. 2, to reach all of the nodes within VLAN A, the BPDUs 211 must tunnel through VLAN B. Although PVST provides a loop-free and best (most direct) path, PVST has significant drawbacks. Namely, tunneling BPDUs through VLAN B uses network resources to encapsulate and deencapsulate the BPDUs 211. Additionally, tunneling delays packet forwarding and also may cause the BPDUs 211 to expire before they reach the outermost node in VLAN A. When BPDUs expire before reaching the outermost node, the outermost node may assume that it is now the root bridge because the outermost node is no longer receiving messages from the root bridge. If the outermost node believes that it is now the root bridge, then the outermost node will begin to send out BPDUs, leading to increased congestion and confusion in the network.

There is therefore a need for an effective way to prevent loops in a network, and especially a geographically large network.

SUMMARY OF THE INVENTION

Loop-elimination in a network is provided by establishing a physical topology based domain within the network and restricting protocol data units that are received within the physical topology based domain from being consumed at a network node outside of the physical topology based domain, wherein the protocol data units include loop-elimination information. In an embodiment, the protocol data units are bridge protocol data units (BPDUs).

The loop-elimination technique may also include identifying a logical based domain that exists within the network and then restricting protocol data units that are received within the physical topology based domain and the logical based domain from being consumed outside of the physical topology based domain and the logical based domain. In an embodiment, the logical based domain is a virtual local area network (VLAN).

The loop-elimination techniques disclosed herein can achieve reduced network convergence times, especially in ring-based topologies and especially in geographically large networks. With typical network topologies, like ring-based topologies, loop elimination decisions like whether to block or forward traffic on a port can be made easily since the topology is already known and it is only necessary to make one physical topology based domain (i.e., one ring) in the network loop free. Furthermore, in symmetrical physical topologies like rings, loop elimination decisions can be made more easily & quickly. Reduced network convergence times can be achieved because physical topology based domains, which represent physical subparts of a network, are being resolved, rather than the entire network or an entire VLAN. The techniques also reduce the distribution of BPDUs throughout an entire network, thereby freeing up valuable bandwidth. Additionally, the techniques also may be used for load balancing across a network by regulating the usage of network devices.

In an embodiment, the loop-elimination technique utilizes Spanning Tree Protocol (STP), as defined by the Institute for Electrical and Electronics Engineers (IEEE) 802.01 D standard, as a loop-elimination protocol.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 10A and 10B are tables which indicate how the distribution of BPDUs is restricted in loop-elimination domains that are established based on physical topology only and in loop-elimination domains that are established based on the combination of physical topology and VLANs, in accordance with an embodiment of the invention.

DETAILED DESCRIPTION OF THE INVENTION

Figure 1:
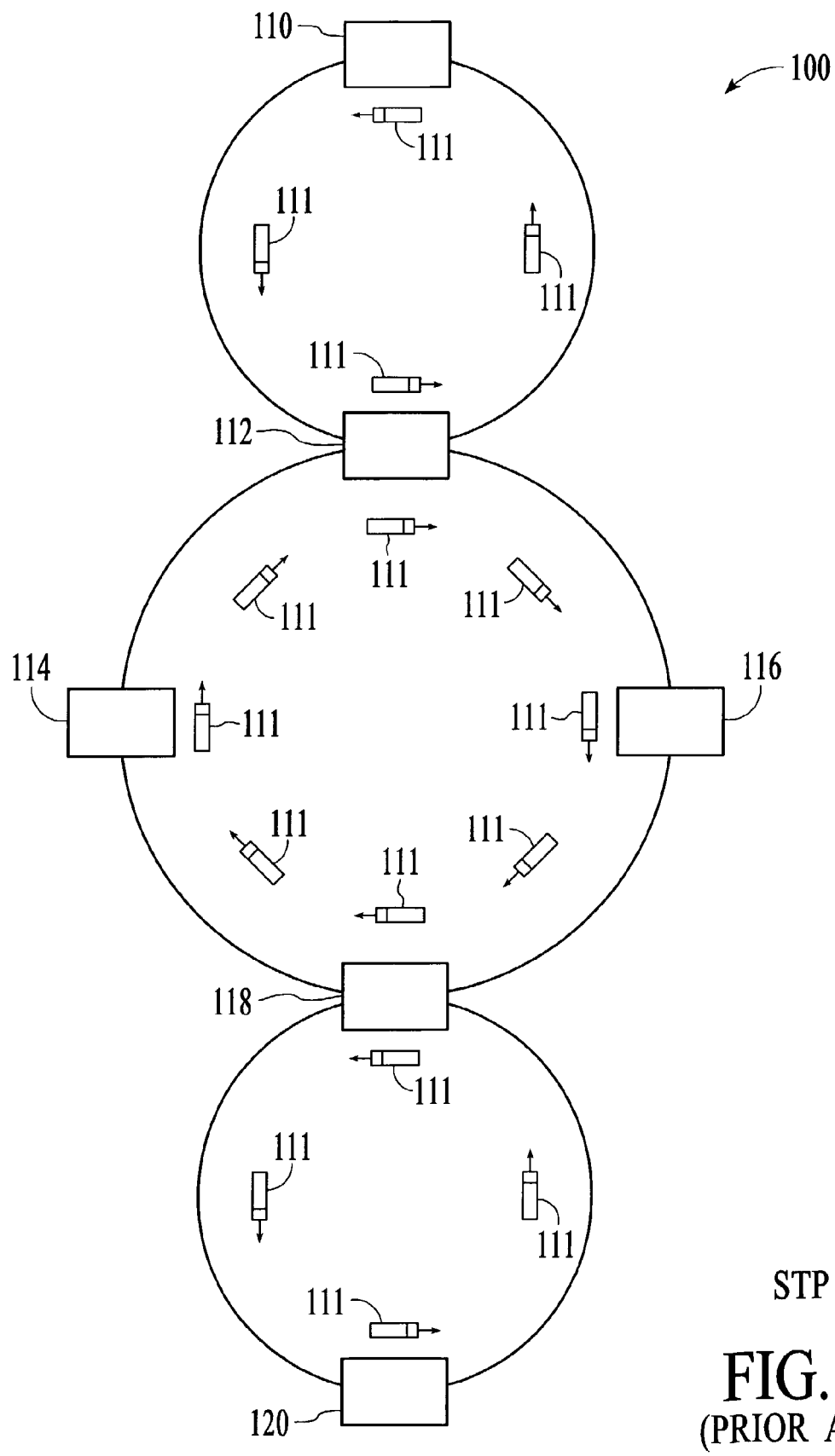
FIG. 1 depicts a bridged network connected by network nodes and composed of three ring structures.
Figure 2:
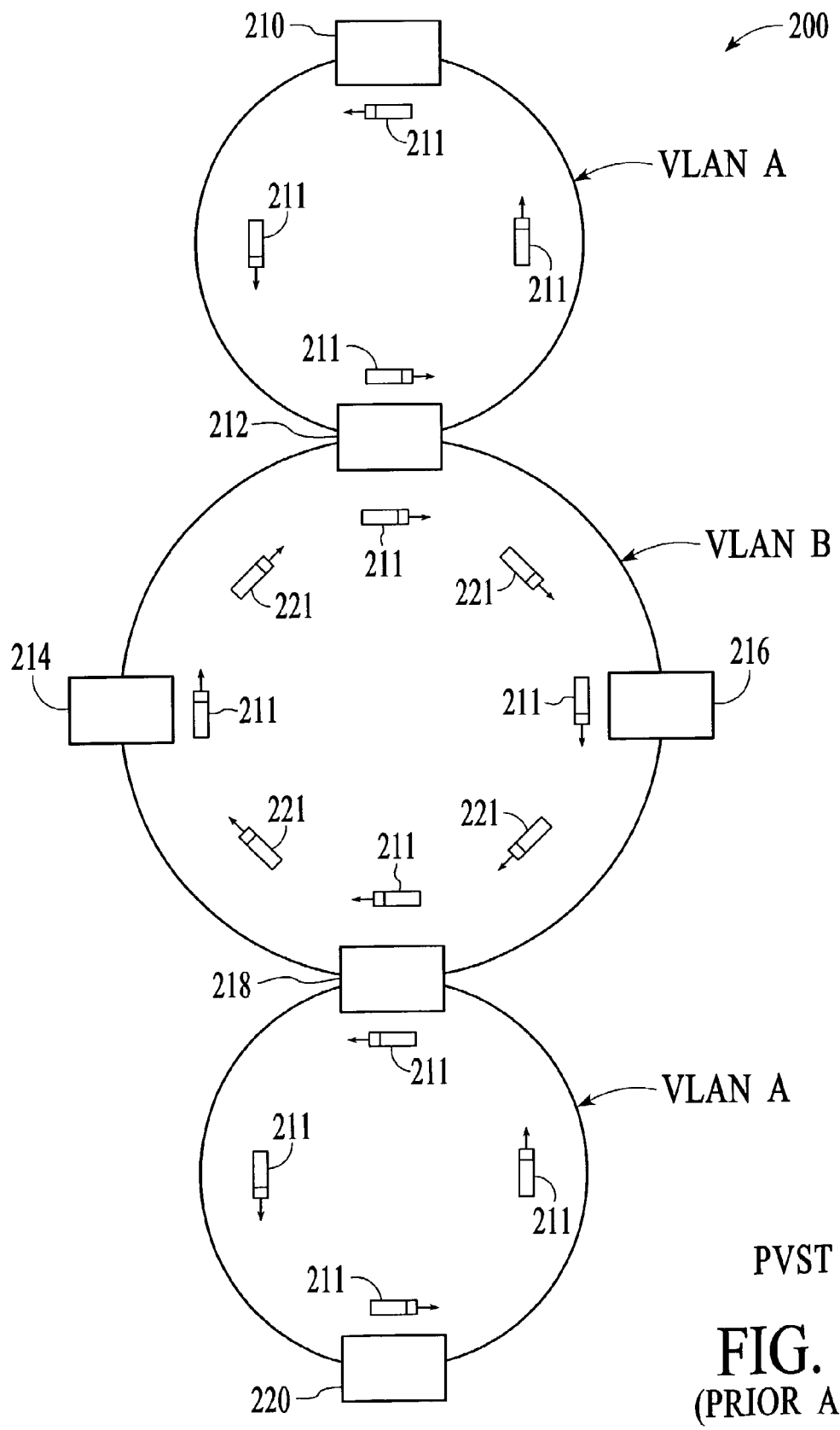
FIG. 2 depicts a bridged network connected by network nodes, composed of three ring structures and supporting two VLANs.
Figure 3:
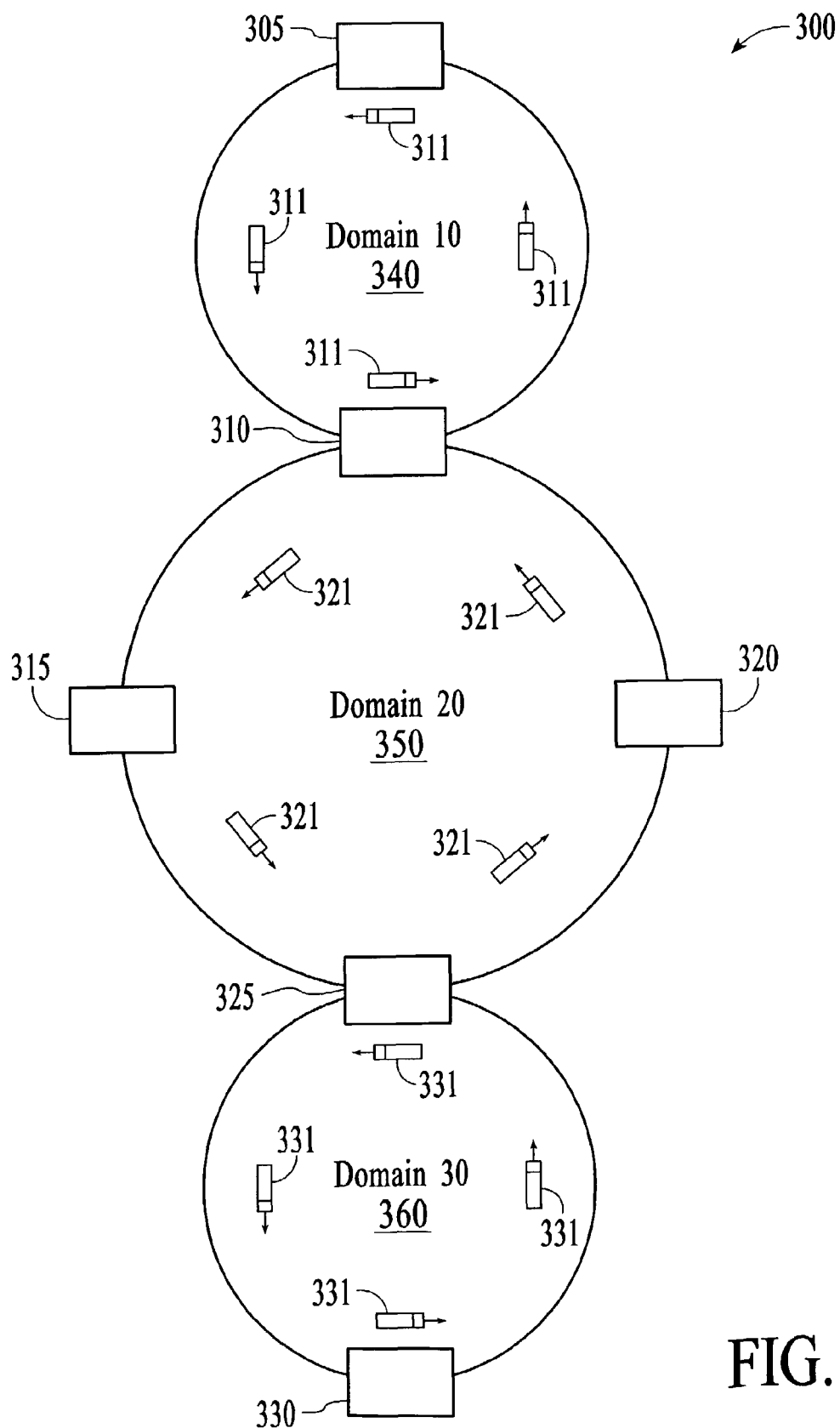
FIG. 3 depicts a bridged network in which loops are prevented, in accordance with an embodiment of the invention, by dividing the network into physical topology based domains and implementing a loop-elimination protocol on a per-physical topology based domain basis.

FIG. 3 depicts an embodiment of a bridged network 300 in which loops are prevented by dividing the network into physical topology based domains and implementing a loop-elimination protocol on a per-physical topology based domain basis. FIG. 3 includes network nodes 305, 310, 315, 320, 325, and 330 that are connected into three rings. In an embodiment, the central ring is a service provider core network and the external rings are service provider access networks. The network nodes handle traffic in discrete segments, often referred to as datagrams. In an embodiment, the network nodes are Ethernet switch/routers that forward traffic using Layer 2, Layer 3, and/or Layer 4 header information where the layers are defined by the International Standards Organization (ISO) in the Open System Interconnection (OSI) model. The network nodes may include port interfaces that support other network protocols such as ATM and Frame Relay. The disclosed loop elimination techniques can be applied to any network node, such as a bridge, a switch, a router, or a switch/router. Although rings of the network 300 may be service provider core and access rings, other types of topologies (i.e., mesh networks) are also contemplated.

In accordance with an embodiment of the invention, the network 300 is divided into separate physical topology based domains. For example, as depicted in FIG. 3, the network is divided into physical topology based domains 10 340, 20 350, and 30 360. In an embodiment, physical topology based domains are defined in response to the physical topology of the network. In an embodiment, the physical topology of the network is the pattern of interconnection between nodes of the network. The term "physical topology" is also used herein to refer to a physical subpart of a network, such as a ring. A physical topology based domain is based on physical topology of the network. In an embodiment, geographically close network nodes are grouped together into physical topology based domains. Physical topology based domains are a subset of the entire network. After the network is divided into separate physical topology based domains, a loop-elimination protocol is implemented on a per-physical topology based domain basis. For example, a separate instance of a loop elimination protocol is run for physical topology based domain 10, for physical topology based domain 20, and for physical topology based domain 30. In an embodiment, running a separate instance of the loop-elimination protocol for each physical topology based domain involves restricting the circulation of Bridge Protocol Data Units (BPDUs) to within their respective physical topology based domains. In one embodiment, the term "BPDU" is interpreted broadly to mean any protocol data unit that includes loop-elimination information. In an embodiment, the loop-elimination information contained in a BPDU or protocol data unit includes Layer 2 Spanning Tree Protocol (STP) information (i.e., the IEEE 802.1D protocol). In the embodiment of FIG. 3, the physical topology based domains 10, 20, and 30 may include all or a portion of the same VLAN or may support different VLANs.

The network nodes include ports and STP is implemented on a per-port basis. In the embodiment of FIG. 3, BPDUs 311 are received at ports that are within physical topology based domain 10, i.e., the ports on nodes 305 and/or 310. BPDUs 321 are received at ports that are within physical topology based domain 20, i.e., the ports on nodes 310, 315, 320, and/or 325. BPDUs 331 are received at ports that are within physical topology based domain 30, i.e., the ports on nodes 325 and/or 330. In accordance with an embodiment of the invention, the distribution of BPDUs is restricted to the physical topology based domain in which they are received. Thus, BPDUs that originate from within a physical topology based domain are restricted to ports in the same domain. The domain in which a BPDU is received is also referred to as the domain to which the BPDU belongs. In an embodiment, distribution of BPDUs is restricted by software logic. In the embodiment of FIG. 3, BPDUs 311 are restricted to physical topology based domain 10, BPDUs 321 are restricted to physical topology based domain 20, and BPDUs 331 are restricted to physical topology based domain 30. In the embodiment of FIG. 3, even if a VLAN, for example VLAN A, exists in both the physical topology based domain 10 and the physical topology based domain 30, BPDUs will not travel across the physical topology based domain 20.

Figure 4:
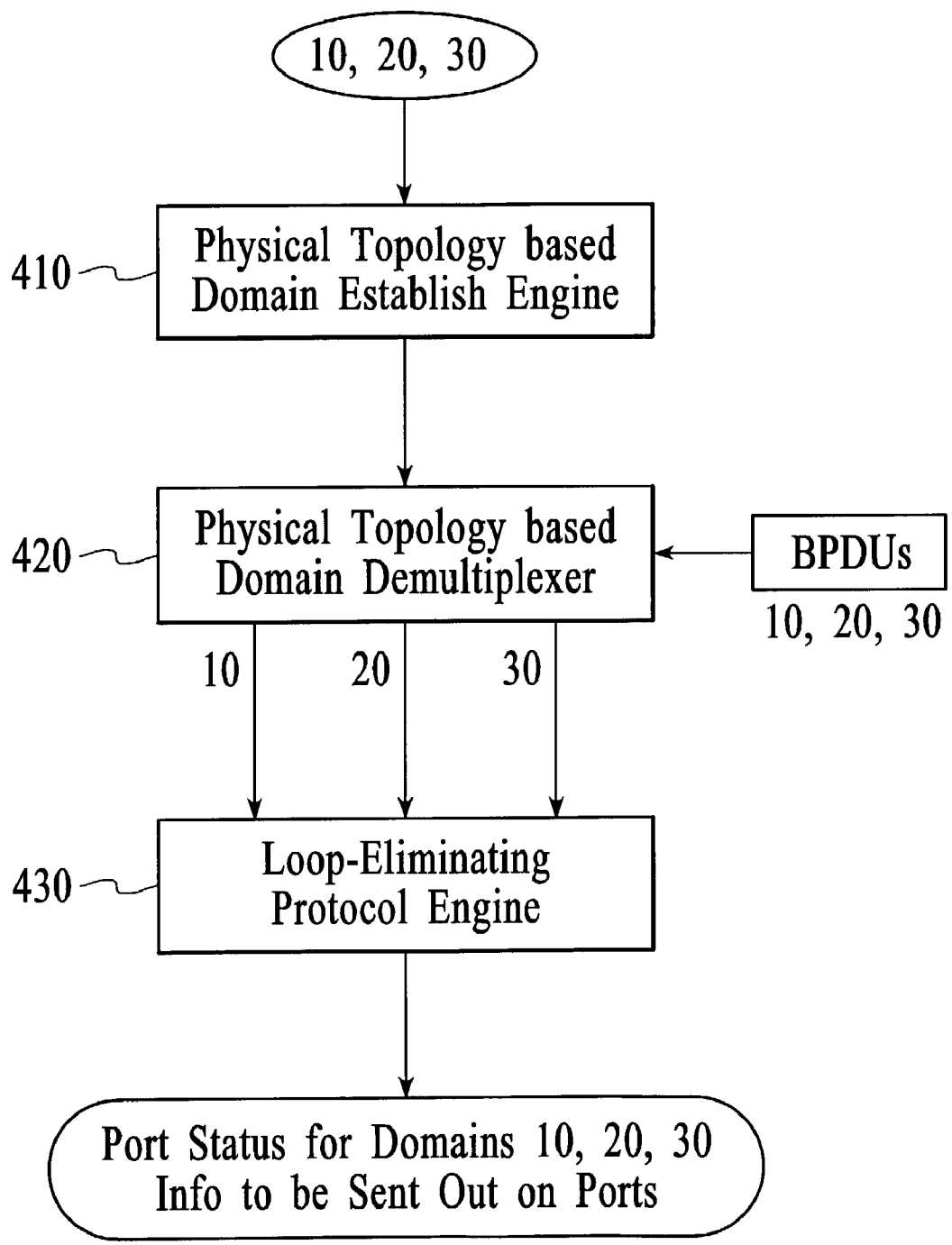
FIG. 4 depicts an embodiment of a system for eliminating loops in a network using physical topology based domains in which an identity of a port on which a protocol data unit is received is used to identify the physical topology based domain to which the BPDU belongs, in accordance with an embodiment of the invention.

FIG. 4 is a logical depiction of a system for eliminating loops in a network using physical topology based domains wherein BPDUs received at a given port are accepted as being in the physical topology based domain to which the port belongs. That is, the physical topology based domain of the receiving port is the physical topology based domain to which the BPDU belongs. In an embodiment, the system of FIG. 4 is used in cases where the receiving port belongs to only one physical topology domain. In the embodiment of FIG. 4, the system includes a physical topology based domain establish engine 410, a physical topology based domain demultiplexer 420, and a loop-eliminating protocol engine 430. The physical topology based domain establish engine 410 receives selections of ports to belong to physical topology based domains in the network and assigns the ports to the respective physical topology based domains. In one embodiment, the port selections are input by a user. In one embodiment, the physical topology based domain establish engine assigns ports to the physical topology based domains 10, 20, and 30 of the embodiment depicted in FIG. 3 based upon port selections input by the user.

The physical topology based domain demultiplexer 420 is communicatively coupled to the physical topology based domain establish engine 410 and receives the port assignments from the physical topology based domain establish engine 410. The physical topology based domain demultiplexer 420 also receives BPDUs from one or more physical topology based domains within the network. The physical topology based domain demultiplexer 420 uses the port assignments to demultiplex the received BPDUs according to physical topology based domains. That is, BPDUs that arrive at the physical topology based domain demultiplexer 420 are logically sorted according to physical topology based domains. After the physical topology based domain demultiplexer 420 logically sorts the received BPDUs according to physical topology based domains, the physical topology based domain demultiplexer 420 provides the logically sorted BPDUs to the loop-eliminating protocol engine.

The loop-eliminating protocol engine 430 is communicatively coupled to physical topology based domain demultiplexer 420. The loop-eliminating protocol engine 430 receives the demultiplexed protocol data units from physical topology based domain demultiplexer 420 and performs a loop-eliminating protocol on a per-physical topology based domain basis using the demultiplexed BPDUs. For example, the loop-eliminating protocol engine 430 may run Spanning Tree Protocol IEEE 802.1D on a per-physical topology based domain basis. The loop-eliminating protocol engine 430 outputs physical topology based domain specific loop-elimination information. In one embodiment, the physical topology based domain specific loop-elimination information includes port states for each physical topology based domain and information to be sent out on ports, such as root bridge information. In an embodiment, the physical topology based domain establish engine, the physical topology based domain demultiplexer, and the loop-eliminating protocol engine are embodied in software. In one embodiment, the system of FIG. 4 resides in a network node, such as node 305, 310, 315, 320, 325, and/or 330. Alternatively, the system may be distributed among the network nodes.

Figure 5:
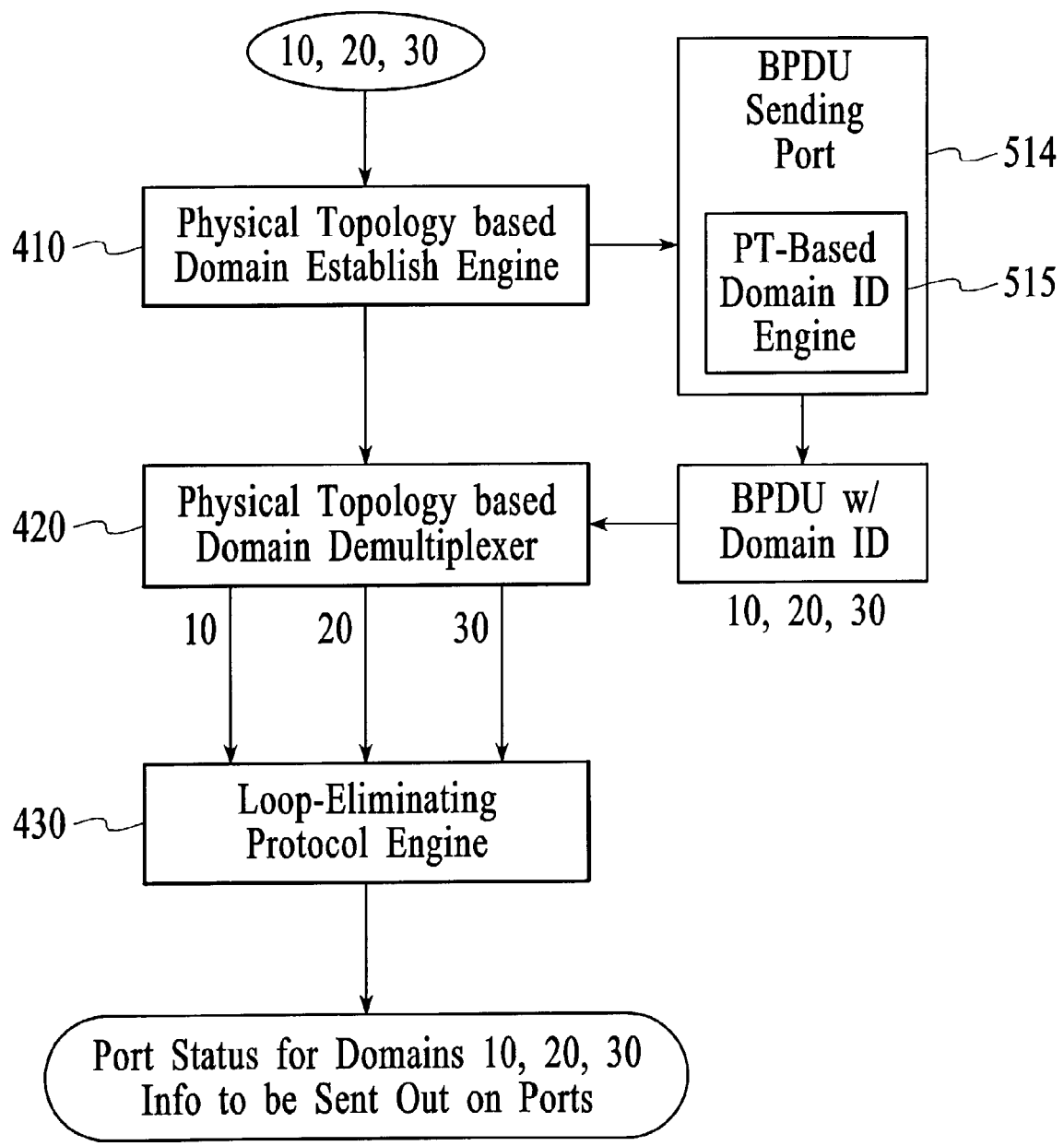
FIG. 5 depicts an alternate embodiment of a system for eliminating loops in a network using physical topology based domains in which a physical topology based domain specific identifier placed within BPDUs is used to identify the physical topology based domain to which the BPDU belongs, in accordance with an embodiment of the invention.

FIG. 5 is a logical depiction of another system for eliminating loops in a network using physical topology based domains in which a physical topology based domain specific identifier (ID) is placed within the BPDUs to identify the physical topology based domain to which the BPDU belongs. In an embodiment, the system of FIG. 5 is used in cases where a receiving port belongs to more than one physical topology based domain. In the embodiment of FIG. 5, the system includes a physical topology based domain establish engine 410, a physical topology based domain demultiplexer 420, a BPDU sending port 514, a physical topology based domain identifier engine 515, and a loop-eliminating protocol engine 430. In the embodiment of FIG. 5, rather than using the identity of a port on which a BPDU is received to identify the physical topology based domain to which the BPDU belongs, each BPDU is marked with an ID that identifies the physical topology based domain to which the BPDU belongs. In this embodiment, as in the embodiment depicted in FIG. 4, the physical topology based domain establish engine 410 assigns ports to a particular physical topology based domain based upon user input. In one embodiment, the physical topology based domain establish engine assigns ports to the physical topology based domains 10, 20, and 30 of the embodiment depicted in FIG. 3. With reference to FIG. 5, the BPDU sending port 514 includes the physical topology based domain ID engine 515 and is communicatively coupled to the physical topology based domain establish engine 410. The BPDU sending port 514 receives port-to-physical topology based domain assignment information from the physical topology based domain establish engine. The physical topology based domain ID engine 515 within the BPDU sending port responds by placing a physical topology based domain-specific ID within each BPDU that originates from the BPDU sending port. A BPDU having a physical topology based domain ID is sent from the BPDU sending port 514. The physical topology based domain demultiplexer 420 receives the BPDU with the physical topology based domain ID and learns the physical topology based domain of the BPDU by looking at the corresponding physical topology based domain ID. The physical topology based domain demultiplexer 420 demultiplexes protocol data units using the physical topology based domain IDs that it receives with the BPDUs. In an embodiment, the physical topology based domain ID is placed within a BPDU by appending additional data to the BPDU or the BPDU header.

Figure 6:
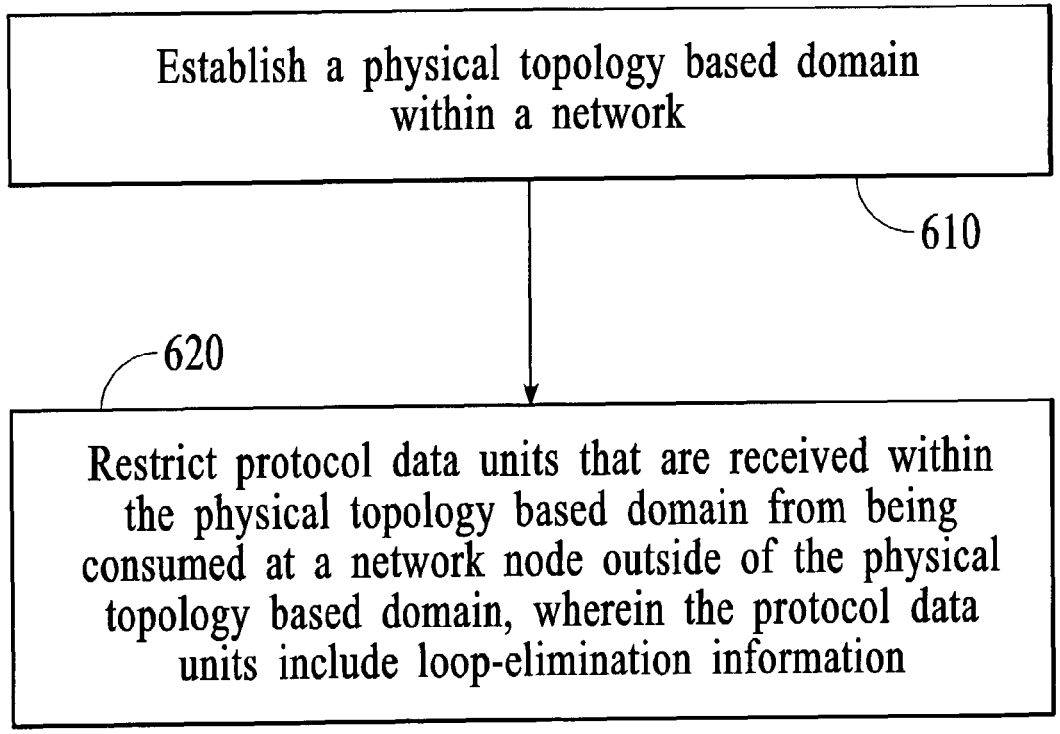
FIG. 6 is a flow diagram of an embodiment of a method for eliminating loops in a network using physical topology based domains, in accordance with an embodiment of the invention.

FIG. 6 is a flow diagram of an embodiment of a method for eliminating loops in a network using physical topology based domains. At block 610, a physical topology based domain is established within a network. At block 620, protocol data units that are received within the physical topology based domain are restricted from being consumed at a network node outside of the physical topology based domain, wherein the protocol data units include loop-elimination information.

Figure 7:
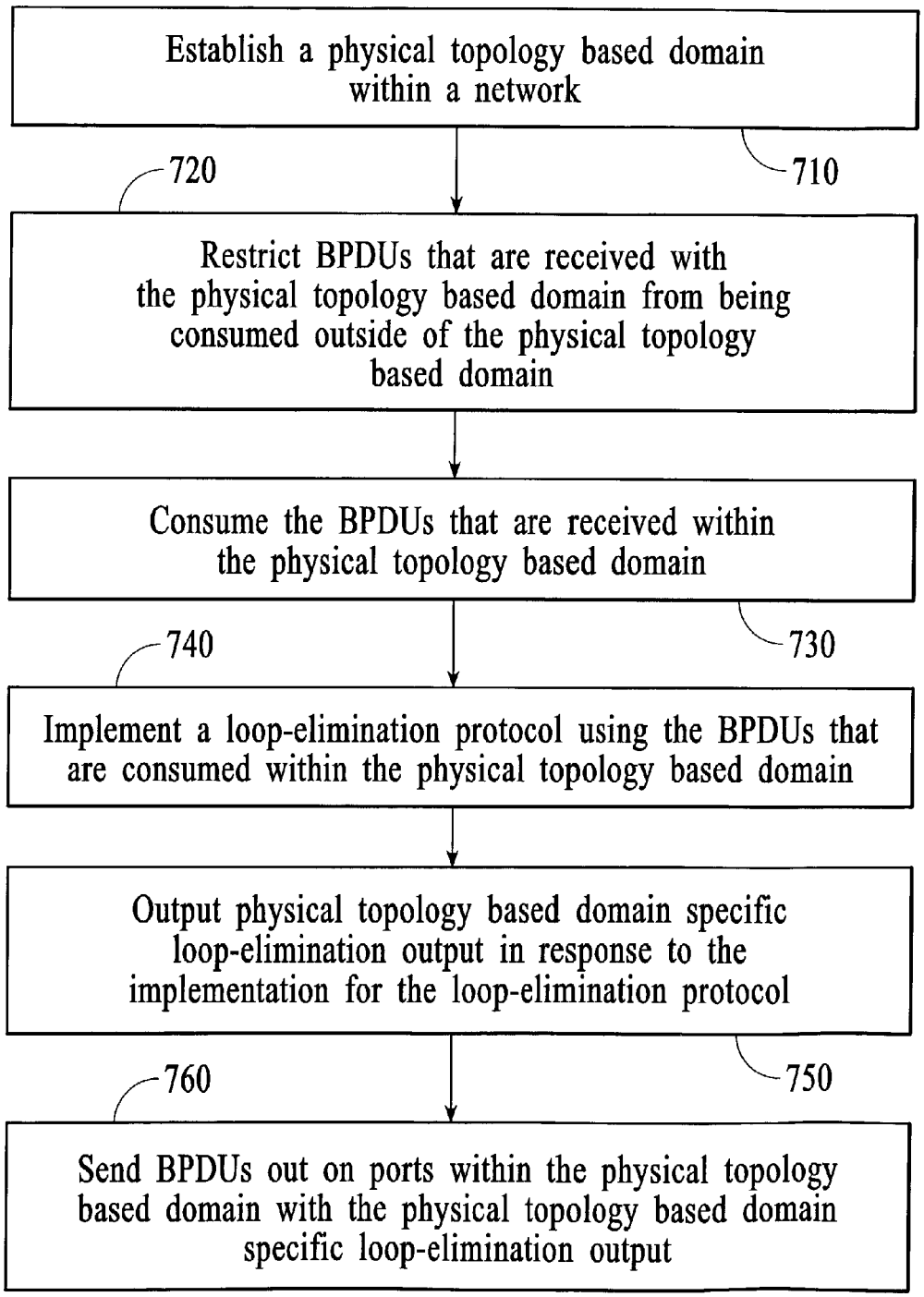
FIG. 7 is a flow diagram of another embodiment of a method for eliminating loops in a network using physical topology based domains, in accordance with an embodiment of the invention.

FIG. 7 is a flow diagram of another embodiment of a method for eliminating loops in a network using physical topology based domains. At block 710, a physical topology based domain is established within a network. At block 720, BPDUs that are received within the physical topology based domain are restricted from being consumed outside of the physical topology based domain. At block 730, the BPDUs that are received within the physical topology based domain are consumed. At block 740, a loop-elimination protocol is implemented using the BPDUs that are consumed within the physical topology based domain. At block 750, physical topology based domain specific loop-elimination information is output in response to the implementation of the loop-elimination protocol. At block 760, BPDUs are sent out on ports within the physical topology based domain with the physical topology based domain specific loop-elimination information.

Figure 8:
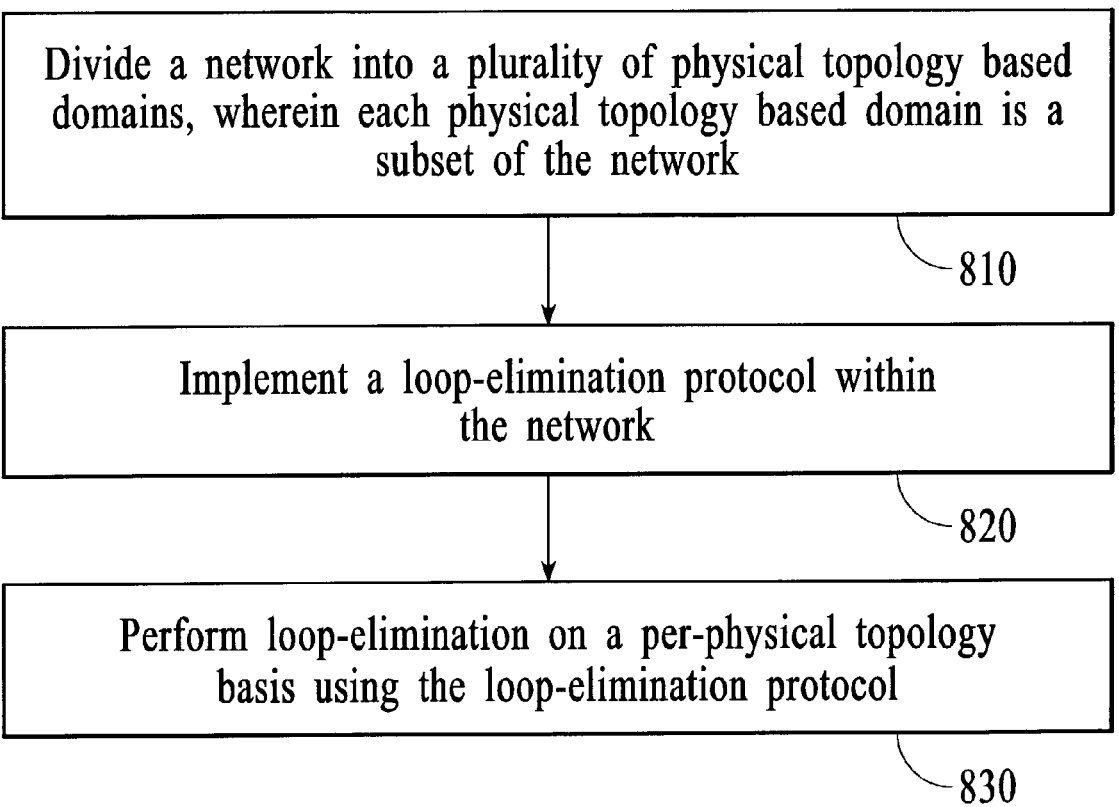
FIG. 8 is a flow diagram of another embodiment of a method for eliminating loops in a network using physical topology based domains, in accordance with an embodiment of the invention.

FIG. 8 is a flow diagram of another embodiment of a method for eliminating loops in a network using physical topology based domains. At block 810, a network is divided into a plurality of physical topology based domains, wherein each physical topology based domain is a subset of the network. At block 820, a loop-elimination protocol is implemented within the network. At block 830, loop-elimination is performed on a per-physical topology basis using the loop-elimination protocol.

Figure 9:
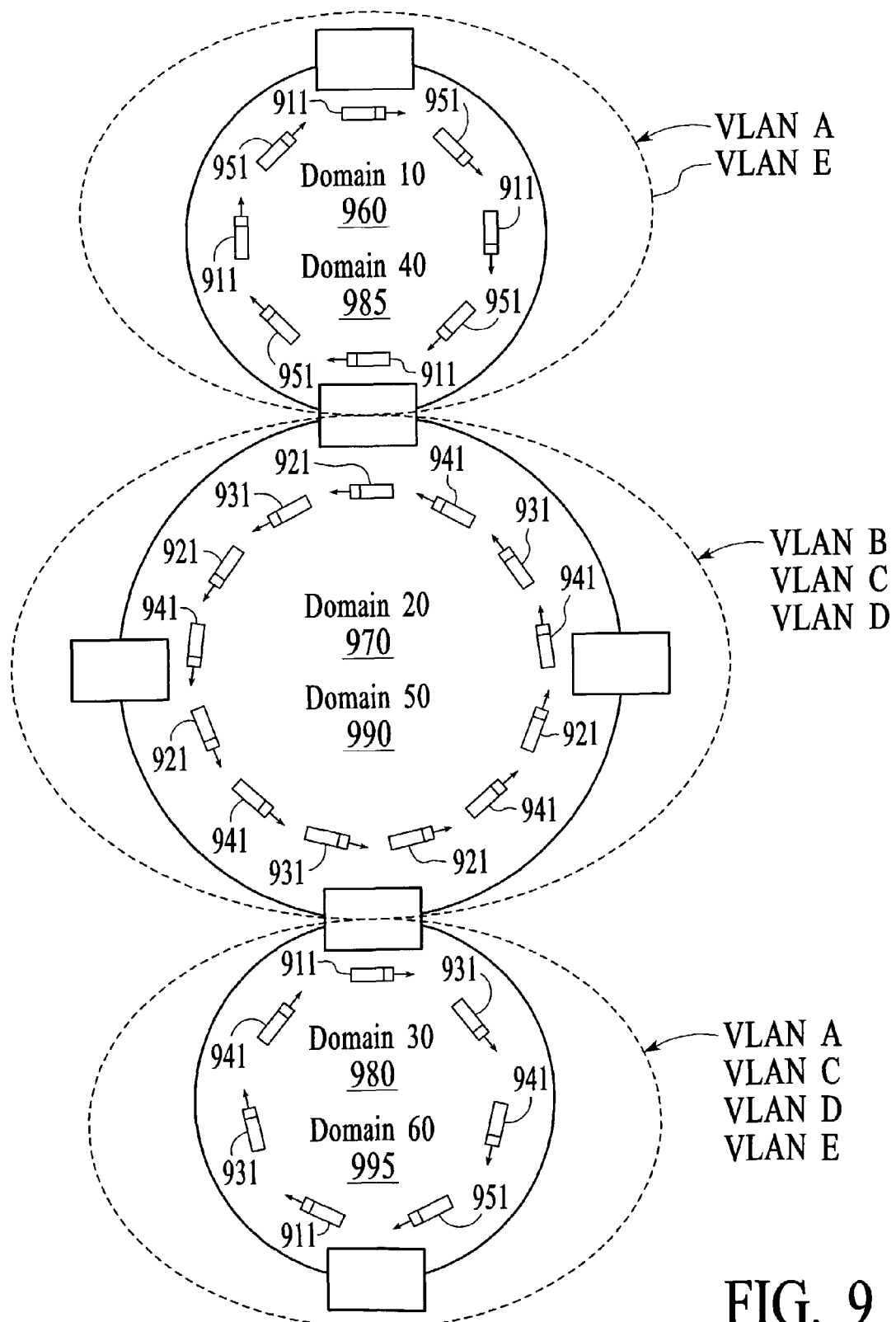
FIG. 9 depicts an embodiment of a network that is divided into physical topology and VLAN based domains, in accordance with an embodiment of the invention.
Figure 11:
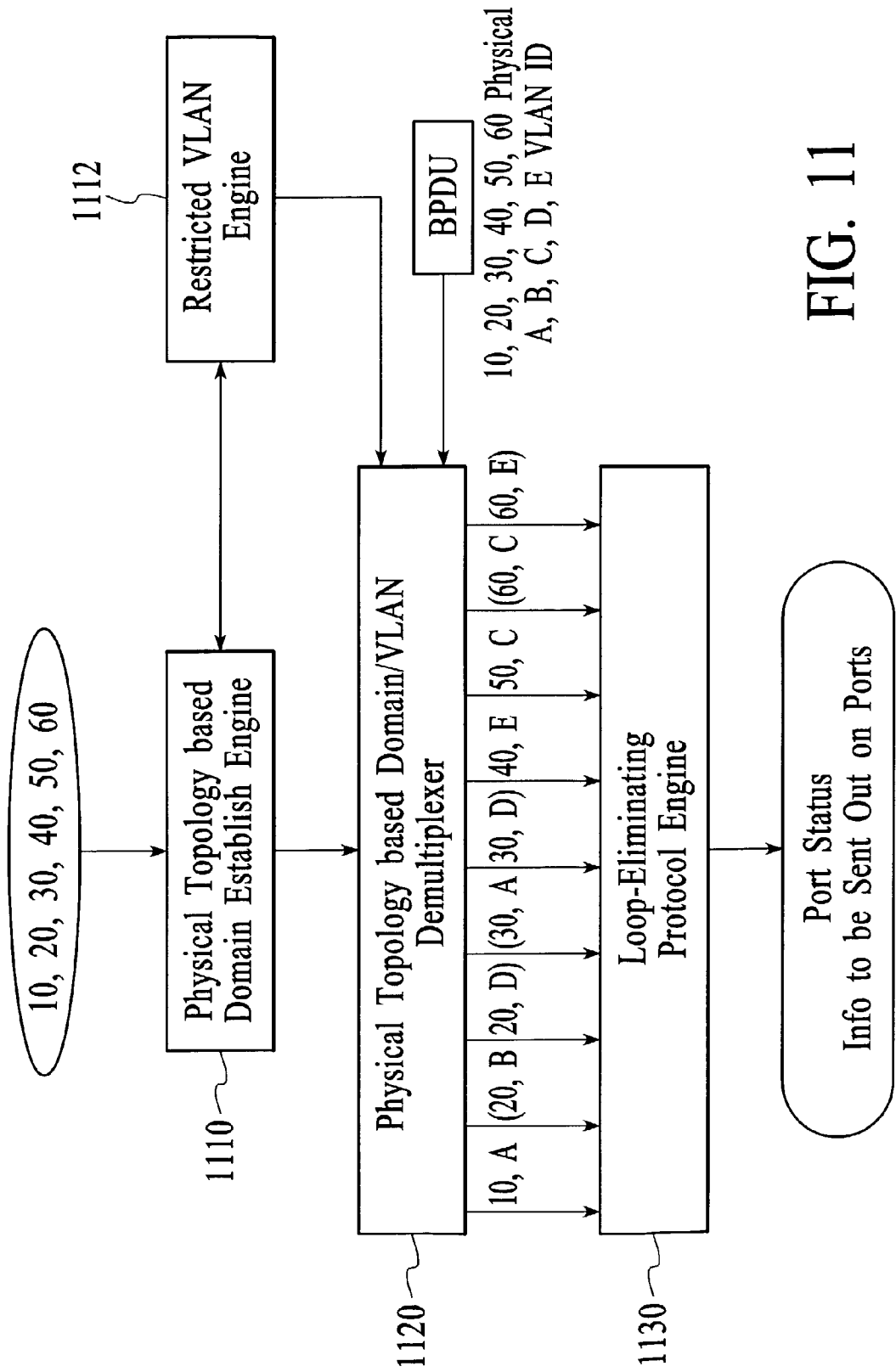
FIG. 11 depicts an embodiment of a system for eliminating loops in a network in which the network is divided into loop-elimination domains on a per-physical topology and per-VLAN basis, in accordance with an embodiment of the invention.

In addition to establishing STP domains based solely upon physical topology, in accordance with another embodiment of the invention, STP domains can be established based upon physical topology and logical relationships (i.e., VLANs). FIGS. 9, 10B and 11 relate to embodiments in which loops are prevented by dividing a network into physical topology based and logical domains and performing loop elimination on a per-domain basis. FIG. 9 depicts an embodiment of a network that is divided into physical topology and VLAN based domains. In the embodiment of FIG. 9, the physical topology based domains established within the network include physical topology based domain 10 960, physical topology based domain 20 970, physical topology based domain 30 980, physical topology based domain 40 985, physical topology based domain 50 990, and physical topology based domain 60 995. The logical domains within the network include VLANs A, B, C, D, and E. In the example of FIG. 9, ports within the physical topology based domain 10 support VLAN A, ports within physical topology based domain 20 support VLANs B and D, ports within physical topology based domain 30 support VLANs A and D ports within the physical topology based domain 40 support VLAN E, ports within physical topology based domain 50 support VLAN C, and ports within physical topology based domain 60 support VLANs C and E.

As described above with reference to FIGS. 3 and 4, physical topology domain-based loop elimination causes all BPDUs, regardless of any VLAN association to be restricted to traveling within their respective physical topology based domains. However, in some cases it may be desirable to have more control over the domain traffic to which loop-elimination protocols are applied. For example, in a network which has multiple physical topology based domains in a given physical topology (i.e., physical topology based domains on a per-ring basis), such as the network depicted in the embodiment of FIG. 9, it may be desirable to restrict the application of a loop-elimination protocol for some VLAN traffic to a certain one of the multiple physical topology based domains while the application of the loop-elimination protocol for other VLAN traffic is restricted to another one of the multiple physical topology based domains. That is, it may be desirable to implement an instance of STP on the combination of a physical topology based domain and a specified VLAN or VLANs. Thus, domains may be created based upon a physical topology plus logical basis. To illustrate, in the embodiment depicted in FIG. 9, each ring of the network supports two physical topology based domains. The top ring supports Domain 10 and Domain 40. The middle ring supports Domain 20 and Domain 50. The bottom ring supports Domain 30 and Domain 60. Each physical topology based domain may be associated with one or more logical subparts, i.e., VLANs. Where there is a physical topology based domain associated with a logical domain (a physical plus logical domain), the distribution of BPDUs is restricted based upon physical topology based domain and logical based domain (i.e., VLAN) For example, in an embodiment, within the top ring, BPDUs related to VLAN A are restricted to VLAN A and Domain 10 and BPDUs related to VLAN E are restricted to VLAN E and Domain 40.

In an embodiment, within each physical topology, there is a "catch-all" physical topology based domain. A catch-all physical topology based domain restricts distribution of BPDUs related to all VLANs supported by a given physical topology (i.e., a physical part of the network, such as a ring) that are not otherwise restricted. For example, the top ring could include physical topology based domain 70, which is a default domain for all VLAN traffic other than VLANs A and E in the top ring.

FIG. 10A is a table that indicates how the distribution of BPDUs can be restricted in loop-elimination domains that are established based on physical topology only and FIG. 10B is a table that indicates how the distribution of BPDUs can be restricted in loop-elimination domains that are established based on the combination of physical topology based domains and logical based domains (i.e., VLANs). FIGS. 10A and 10B should be considered in view of FIG. 9. FIG. 10A depicts an embodiment of the distribution of BPDUs in the physical topology based domains 10, 20, and 30, in which the distribution of BPDUs is restricted solely on a physical topology basis. It is unnecessary to include physical topology based domains 40, 50, and 60 as part of the network in the embodiment of FIG. 10A since BPDU restrictions are on the basis of physical topology only and no distinction is being made between VLANs. That is, since all VLANs within a given physical topology are treated equally in the embodiment of FIG. 10A, a single physical topology based domain, rather than multiple physical topology based domains, is sufficient to restrict BPDU traffic to within a given physical topology. In such case, the distribution of BPDUs relating to all of the VLANs supported by a given physical topology are restricted to the physical topology based domain within the given physical topology (i.e., the ring). That is, in loop-elimination domains that are established based on physical topology only, the distribution of all BPDUs that are received within a particular physical topology based domain are restricted to the particular physical topology based domain within the physical topology. The restrictions represented in FIG. 10A are not depicted in FIG. 9 and are provided for comparison with the restrictions represented in FIG. 10B.

FIG. 10B represents another embodiment of the distribution of BPDUs in the physical topology based domains 10, 20, 30, 40, 50, and 60, in which the distribution of protocol data units is restricted on the combination of a physical topology based domain and a logical domain (i.e., per-VLAN) basis. In such case, only the distribution of BPDUs relating to specified VLANs are restricted to the respective physical topology based domain of the BPDUs. That is, since BPDU distribution is restricted on a per-physical topology and per-VLAN basis, BPDU distribution can be selectively restricted to a particular physical topology based domain on a per-logical domain (i.e., per-VLAN) basis. For example, in the table shown in FIG. 10B, Domain 10 restricts only the distribution of BPDUs related to VLAN A, and Domain 40 restricts only the distribution of BPDUs related to VLAN E.

FIG. 9 illustrates how BPDU traffic flows through the network when the BPDU restrictions of the table of FIG. 10B are in place. As depicted in the embodiment of FIG. 9, distribution of protocol data units is restricted on a per-physical topology based domain and per-VLAN basis. BPDUs are related to a VLAN in which they are received (i.e., VLAN to which they belong). Alternatively, the VLAN to which the packet belongs can be identified by a VLAN ID. For example, in the embodiment of FIG. 9, BPDUs 911 relate to VLAN A, BPDUs 921 relate to VLAN B, BPDUs 931 relate to VLAN C, BPDUs 941 relate to VLAN D, and BPDUs 951 relate to VLAN E. As examples of BPDU distribution restrictions, in the embodiment of FIG. 9, in the physical topology based domain 10, BPDUs 911 that relate to VLAN A are restricted from entering the physical topology based domains 20, 30, 50 or 60. BPDUs 911 that relate to VLAN A and physical topology based domain 10 can enter physical topology based domain 40 but will not be considered in loop-elimination calculations for physical topology based domain 40. Although the physical topology based domain 30 does have BPDUs 911 related to VLAN A present, the BPDUs 911 present in the physical topology based domain 30 are received at a port or ports in VLAN A within the physical topology based domain 30. In the physical topology based domain 20, BPDUs 921 that relate to VLAN B are restricted from entering the physical topology based domains 10, 30, 40, or 60. BPDUs 921 that relate to VLAN B and physical topology based domain 20 can enter physical topology based domain 50 but will not be considered in loop-elimination calculations for physical topology based domain 50. Also in the physical topology based domain 20, BPDUs 941 that relate to VLAN D are restricted from entering the physical topology based domains 10, 30, 40, or 60. BPDUs 941 that relate to VLAN D and physical topology based domain 20 can enter physical topology based domain 50 but will not be considered in loop-elimination calculations for physical topology based domain 50. Although the physical topology based domain 30 does have BPDUs 941 related to VLAN D present, the BPDUs 941 present in the physical topology based domain 30 are received at a port or ports in VLAN D within the physical topology based domain 30. In the physical topology based domain 30, BPDUs 911 that relate to VLAN A are restricted from entering the physical topology based domains 10, 20, 40, or 50. Also in the physical topology based domain 30, BPDUs 941 that relate to VLAN D are restricted from entering the physical topology based domains 10, 20, 40, or 50. BPDUs 911 that relate to VLAN A and physical topology based domain 30 and BPDUs 941 that relate to VLAN D and physical topology based domain 30 can enter physical topology based domain 60 but will not be considered in loop-elimination calculations for physical topology based domain 60. In the physical topology based domain 40, BPDUs 951 that relate to VLAN E are restricted from entering the physical topology based domains 20, 30, 50, or 60. BPDUs 951 that relate to VLAN E and physical topology based domain 40 can enter physical topology based domain 10 but will not be considered in loop-elimination calculations for physical topology based domain 10. Although the physical topology based domain 60 does have BPDUs 951 related to VLAN E present, the BPDUs 951 present in the physical topology based domain 60 are received at a port or ports in VLAN E within the physical topology based domain 60. In the physical topology based domain 50, BPDUs 931 that relate to VLAN C are restricted from entering the physical topology based domains 10, 30, 40, or 60. BPDUs 931 that relate to VLAN C and physical topology based domain 50 can enter physical topology based domain 20 but will not be considered in loop-elimination calculations for domain 20. Although the physical topology based domain 60 does have BPDUs 931 related to VLAN C present, the BPDUs 931 present in the physical topology based domain 60 are received at a port or ports in VLAN C within the physical topology based domain 60. In the physical topology based domain 60, BPDUs 931 that relate to VLAN C are restricted from entering the physical topology based domains 10, 20, 40, or 50. Also in the physical topology based domain 60, BPDUs 951 that relate to VLAN E are restricted from entering the physical topology based domains 10, 20, 40, or 50. BPDUs 931 that relate to VLAN C and physical topology based domain 60 and BPDUs 951 that relate to VLAN E and physical topology based domain 60 can enter physical topology based domain 30 but will not be considered in loop-elimination calculations for physical topology based domain 30.

FIG. 11 depicts an embodiment of a system for eliminating loops in a network in which the network is divided into loop-elimination domains on a per-physical topology based domain and per-VLAN basis. In the embodiment of FIG. 11, the system includes a physical topology based domain establish engine 1110, a restricted VLAN engine 1112, a physical topology based domain/VLAN demultiplexer 1120, and a loop-eliminating protocol engine 1130. The physical topology based domain establish engine 1110 receives selections of ports to belong to physical topology based domains in the network and assigns the ports to the respective physical topology based domains. In one embodiment, the physical topology based domain establish engine 1110 receives port selections and makes port assignments for the domains 10, 20, 30, 40, 50, and 60 of FIG. 9. The physical topology based domain establish engine 1110 is communicatively coupled to restricted VLAN engine 1112 and physical topology based domain 10 demultiplexer 1120. The restricted VLAN engine receives input which assigns VLANs to physical topology based domains. When a VLAN is assigned to a physical topology based domain, distribution of BPDUs related to that VLAN is restricted to within the physical topology based domain. For example, the restricted VLANs may be selected from VLAN A, VLAN B, VLAN C, VLAN D, and VLAN E as depicted with reference to FIG. 9. In one embodiment, a user, such as a network manager, inputs VLAN restrictions into the restricted VLAN engine.

The restricted VLAN engine 1112 and the physical topology based domain establish engine 1110 are communicatively coupled to the physical topology based domain/VLAN demultiplexer 1120. The physical topology based domain/VLAN demultiplexer receives port assignments from the physical topology based domain establish engine and VLAN-based BPDU restrictions from the restricted VLAN engine. The physical topology based domain/VLAN demultiplexer also receives BPDUs, the BPDUs being identified with their respective physical topology based domain and VLAN. In an embodiment, the BPDUs are marked with a VLAN ID to identify the VLAN to which the BPDUs belong and a by a physical topology based domain ID to identify the physical topology based domain to which the BPDUs belong. In another embodiment, the physical topology based domain to which a BPDU belongs is identified by the identity of the port on which the BPDU was received. The physical topology based domain/VLAN demultiplexer uses the port identification and the VLAN restrictions to demultiplex the received BPDUs on a per-physical topology and per-VLAN basis. That is, the physical topology based domain/VLAN demultiplexer logically sorts incoming BPDUs according to the combination of VLAN and physical topology based domain. For example, in the embodiment depicted in FIG. 11, the physical topology based domain/VLAN demultiplexer logically sorts BPDUs belonging to physical topology based domain 10 and VLAN A (noted as "10, A"). In the example of FIG. 11, the physical topology based domain/VLAN demultiplexer also logically sorts BPDUs for the other physical topology based domains and VLANs including: 20, B; 20, D; 30, A; 30, D; 40, E; 50, C; 60, C; 60, E. Note that, in the embodiment depicted in FIG. 11, BPDUs are grouped (placed in "groups") according to physical topology, as indicated by the parenthesis around (20, B; 20, D), (30, A; 30, D), (60, C; 60, E). Loopeliminating protocol engine 1130 is communicatively coupled to the physical topology based domain/ VLAN demultiplexer. The loop-eliminating protocol engine implements a loop-eliminating protocol on a per-physical topology and per-VLAN basis and outputs physical topology based domain and VLAN specific loop-elimination information, such as port states and root bridge information. For example, the loop-eliminating protocol engine implements a loop-elimination protocol for the domain as defined by physical topology based domain 10 and the logical domain VLAN A of FIG. 9. Likewise, the loop-eliminating protocol engine implements a loop-elimination protocol for the domain defined by the physical topology based domain 20 and for the logical domain VLAN B of FIG. 9. In an embodiment, the loop-eliminating protocol engine is not concerned directly with domains or VLANs. Rather it performs loop-elimination calculations with the information it has about a group, such as (20, B; 20, D). In such an embodiment, the loop-eliminating protocol engine may output port states for the VLANs in the group and may also transmit information for the group in a BPDU having the corresponding physical topology based domain ID. Alternatively, if a port is used to identify the loop-elimination instance, the BPDU can be sent without the physical topology based domain ID.

In one embodiment, the methods described above are embodied in a computer-readable media as computer instruction code. It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method for eliminating loops in a bridged network comprising:
    establishing a physical topology based domain within said bridged network, wherein said physical topology based domain is a physical subpart of said bridged network and defines a pattern of interconnection between nodes within said bridged network; and
    restricting protocol data units that are received within said physical topology based domain from being consumed at a network node outside of said physical topology based domain, said protocol data units comprising loop-elimination information.

2. The method of claim 1 wherein said loop-elimination information further comprises layer two loop-elimination information.

3. The method of claim 1 further comprising identifying a logical based domain that exists within said bridged network and wherein said restricting comprises restricting protocol data units that are received within said physical topology based domain and said logical based domain from being consumed outside of said physical topology based domain and said logical based domain.

4. The method of claim 3 wherein said logical based domain is a virtual local area network (VLAN).

5. The method of claim 1 wherein said loop-elimination information further comprises Spanning Tree Protocol (STP) information.

6. A method for eliminating loops in a bridged network comprising:
    establishing a physical topology based domain within said bridged network, wherein said physical topology based domain is a physical subpart of said bridged network and defines a pattern of interconnection between nodes within said network;
    restricting bridge protocol data units (BPDUs) that are received within said physical topology based domain from being consumed outside of said physical topology based domain;
    consuming, said BPDUs that are received within said physical topology based domain;
    implementing a loop-elimination protocol using said BPDUs that are consumed within said physical topology based domain;
    outputting physical topology based domain specific loop-elimination information in response to said implementing of said loop-elimination protocol; and
    sending BPDUs out on ports within said physical topology based domain with said physical topology based domain specific loop-elimination information.

7. The method of claim 6 wherein said loop-elimination protocol comprises Spanning Tree Protocol (STP).

8. The method of claim 6 further comprising identifying a logical based domain that exists within said bridged network and wherein said restricting comprises restricting BPDUs that are received within said physical topology based domain and said logical based domain from being consumed outside of said physical topology based domain and said logical based domain.

9. The method of claim 8 wherein said logical based domain is a virtual local area network (ULAN).

10. The method of claim 6 wherein said establishing a physical topology based domain further comprises assigning at least one port within said bridged network to be part of said physical topology based domain.

11. The method of claim 10 wherein said physical topology based domain specific loop-elimination information is selected from the group consisting of:
    at least one port state for said at least one port that is assigned to be part of said physical topology based domain; and
    root bridge information to be sent out on said at least one port that is assigned to be part of said physical topology based domain.

12. The method of claim 6 wherein only BPDUs that are received within said physical topology based domain are consumed by a port within said physical topology based domain.

13. The method of claim 6 further comprising including a physical topology based domain identifier within BPDUs such that a receiving port within said physical topology based domain can recognize that said BPDUs belong to said physical topology based domain by said physical topology based domain identifier.

14. The method of claim 6 further comprising recognizing a BPDU as belonging to a physical topology based domain by the identity of a port that receives said BPDU.

15. A method for eliminating loops in a bridged network comprising:
dividing said bridged network into a plurality of domains based upon physical topology of said bridged network, wherein said physical topology based domains are physical subparts of said bridged network and define patterns of interconnection between nodes within said bridged network;
configuring ports that connect a network node in said bridged network to a first domain of said plurality of domains to participate in said first domain;
enabling Spanning Tree Protocol (STP) on at least one port in said first domain; and
consuming, at said at least one port in said first domain, a bridge protocol data unit (BPDU) that is received at a port in said first domain.

16. The method of claim 15 further comprising implementing STP on a per-domain basis within said first domain.

17. A method for eliminating loops in a bridged network comprising:
dividing said bridged network into a plurality of physical topology based domains, wherein each physical topology based domain is a subset of said bridged network, wherein said physical topology based domains define patterns of interconnection between nodes within said bridged network;
implementing a loop-elimination protocol within said bridged network; and
performing loop-elimination on a per-physical topology basis using said loop-elimination protocol.

18. The method of claim 17 wherein said dividing said bridged network into a plurality of physical topology based domains further comprises restricting flow of bridge protocol data units (BPDUs) to within physical topology based domains.

19. The method of claim 17 further comprising identifying a logical based domain that exists within said bridged network with a physical topology based domain and wherein said performing of loop-elimination is performed on a per-logical based domain basis.

20. A computer program product for eliminating loops in a bridged network comprising:
computer program code for;
establishing a physical topology based domain within said bridged network, wherein said physical topology based domain is a physical subpart of said bridged network and defines a pattern of interconnection between nodes within said bridged network; and
restricting protocol data units that are received within said physical topology based domain from being consumed at a network node outside of said physical topology based domain, said protocol data units comprising loop-elimination information.

21. The computer program product of claim 20 further comprising computer program code for identifying a logical based domain that exists within said bridged network and wherein said restricting comprises restricting protocol data units that are received within said physical topology based domain and said logical based domain from being consumed outside of said physical topology based domain and said logical based domain.

22. A computer program product for eliminating loops in a bridged network comprising:
computer program code for;
establishing a physical topology based domain within said bridged network, wherein said physical topology based domain is a physical subpart of said bridged network and defines a pattern of interconnection between nodes within said bridged network;
restricting bridge protocol data units (BPDUs) that are received within said physical topology based domain from being consumed outside of said physical topology based domain;
consuming, within said physical topology based domain, BPDUs that are received within said physical topology based domain;
implementing a loop-elimination protocol using said BPDUs that are consumed within said physical topology based domain;
outputting physical topology based domain specific loop-elimination information in response to said implementing of said loop-elimination protocol; and
sending BPDUs out on ports within said physical topology based domain with said physical topology based domain specific loop-elimination information.

23. The computer program product of claim 22 further comprising computer program code for identifying a logical based domain that exists within said bridged network and wherein said restricting comprises restricting BPDUs that are received within said physical topology based domain and said logical based domain from being consumed outside of said physical topology based domain and said logical based domain.

24. A computer program product for eliminating loops in a bridged network comprising:
computer program code for;
dividing said bridged network into a plurality of domains based upon physical topology of said bridged network, wherein said physical topology based domains are physical subparts of said bridged network and define patterns of interconnection between nodes within said bridged network;
configuring ports that connect a network node in said bridged network to a first domain of said plurality of domains to participate in said first domain; and
enabling Spanning Tree Protocol (STP) on at least one port in said first domain;
consuming, at said at least one port in said first domain, a bridge protocol data unit (BPDU) that is received at a port in said first domain.

25. The computer program product of claim 24 further comprising computer program code for implementing STP on a per-domain basis within said first domain.

26. A computer program product for eliminating loops in a bridged network comprising:
computer program code for;
dividing said bridged network into a plurality of physical topology based domains, wherein each physical topology based domain is a subset of said bridged network and wherein said physical topology based domains define patterns of interconnection between nodes within said bridged network;

implementing a loop-elimination protocol within said bridged network; and performing loop-elimination on a per-physical topology basis using said loop-elimination protocol.

27. The computer program product of claim 26 further comprising computer program code for identifying a logical based domain that exists within said bridged network with a physical topology based domain and wherein said performing of loop-elimination is performed on a per-logical based domain basis.

28. A system for eliminating loops in a bridged network comprising:

a physical topology based domain establish engine configured to assign a selection of ports in said bridged network to be part of a physical topology based domain within said bridged network in response to an input of said selection of ports, wherein said physical topology based domain is a physical subpart of said bridged network and defines a pattern of interconnection between nodes within said bridged network;

a physical topology based domain demultiplexer configured to receive said selection of ports from said physical topology based domain establish engine, to receive bridge protocol data units (BPDUs) from ports within the bridged network, and to demultiplex said BPDUs received according to physical topology based domain, said physical topology based domain being identified by said selection of ports; and a loop-eliminating protocol engine configured to receive said demultiplexed BPDUs from said physical topology based domain demultiplexer and to perform loop-elimination on a per-physical topology based domain basis using said demultiplexed BPDUs.

29. A system for eliminating loops in a bridged network comprising:

a physical topology based domain establish engine configured to assign a selection of ports in said bridged network to be part of a physical topology based domain within said bridged network in response to an input of said selection of ports, wherein said physical topology based domain is a physical subpart of said bridged network and defines a pattern of interconnection between nodes within said bridged network;

a logic based domain restriction engine configured to place a restriction upon distribution of bridge protocol data units (BPDUs) that are received within a logic based domain, said restriction preventing said BPDUs from being distributed outside said physical topology based domain and said logical based domain, in response to a second input that specifies said restriction;

a physical topology based and logic based domain demultiplexer configured to receive said input designating a selection of ports from said physical topology based domain establish engine, to receive said restriction from said logic based domain restriction engine, to receive BPDUs from ports within the bridged network, and to demultiplex said received BPDUs according to said physical topology based domain and said logic based domain; and a loop-eliminating protocol engine configured to receive said demultiplexed BPDUs from said physical topology based and logic based domain demultiplexer and to perform loop-elimination on a per-physical topology based domain and per-logic based domain basis using said demultiplexed BPDUs.

\* \* \* \* \*